United States Patent

Suzuki et al.

[11] Patent Number: 5,890,019
[45] Date of Patent: Mar. 30, 1999

[54] OPTICAL AXIS ANGLE VARIATION MECHANISM OPTICAL AXIS ANGLE VARIATION APPARATUS AND IMAGE STABILIZER

[75] Inventors: Koji Suzuki; Nobuchika Momochi, both of Kanagawa, Japan

[73] Assignee: Sony Corporation, Tokyo, Japan

[21] Appl. No.: 934,478

[22] Filed: Sep. 19, 1997

[30] Foreign Application Priority Data

Sep. 20, 1996 [JP] Japan ................................. 8-250723

[51] Int. Cl.⁶ .................................................. G03B 17/00
[52] U.S. Cl. .................................................. 396/55
[58] Field of Search ........................... 396/55; 359/554, 359/555, 556, 557

[56] References Cited

U.S. PATENT DOCUMENTS

| 5,376,993 | 12/1994 | Kubota et al. | 396/55 |
| 5,655,157 | 8/1997 | Enomoto | 396/55 |

FOREIGN PATENT DOCUMENTS

| 61-269572 | 11/1986 | Japan . |
| 06-70220 | 3/1994 | Japan . |
| 06-118471 | 4/1994 | Japan . |
| 06-281889 | 10/1994 | Japan . |
| 97-168235 | 7/1995 | Japan . |

*Primary Examiner*—W. B. Perkey
*Attorney, Agent, or Firm*—Frommer Lawrence & Haug, LLP; William S. Frommer

[57] ABSTRACT

The invention provides an image stabilizer by which, even where it is applied to an image stabilizing optical apparatus which employs an optical axis angle variation mechanism in which an optical system of the afocal type is employed, problems of interference with an imaging optical system and so forth can be solved. A plano-concave lens and a plano-convex lens form an optical system of the afocal type. A turning shaft supports the plano-concave lens for turning movement in a plane perpendicular to an optical system of the optical system while a turning shaft supports the plano-convex lens for turning movement in another plane perpendicular to the optical axis. A pair of shaking detectors, a calculation section, a pair of drive circuits, and a pair of drive motors drive the plano-concave lens and plano-convex lens to turn to compensate for or cancel hand-shaking of the optical system.

11 Claims, 6 Drawing Sheets

F I G. 4
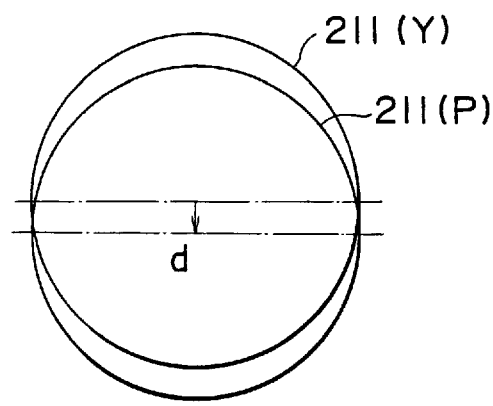
F I G. 5
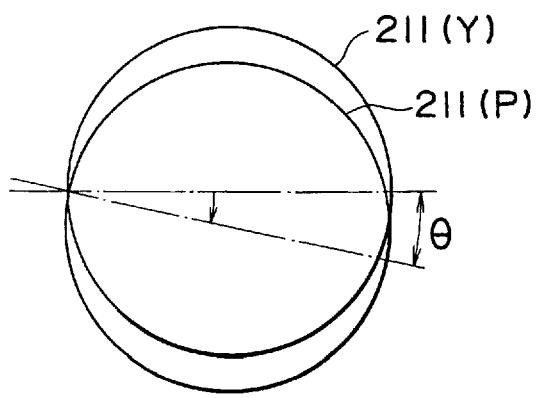

OPTICAL AXIS ANGLE VARIATION MECHANISM OPTICAL AXIS ANGLE VARIATION APPARATUS AND IMAGE STABILIZER

BACKGROUND OF THE INVENTION

This invention relates to an image stabilizer suitable for use with an image stabilizing optical apparatus provided, for example, in a video tape recorder integrated with a camera (hereinafter referred to as "video camera"). The present invention further relates to an optical axis angle variation apparatus suitable for use to realize an image stabilizer of the type mentioned and also to an optical axis angle variation mechanism suitable for use to realize an optical axis angle variation apparatus of the type mentioned.

In recent years, also for a video camera for broadcasting business use, it becomes demanded to have an image stabilizer for suppressing shaking of an imaged image caused by hand-shaking because of reduction of skilled cameramen and so forth.

In order to satisfy this demand, it has been proposed to employ an image stabilizing optical apparatus which is employed by video cameras for general consumers.

As one of image stabilizing optical apparatus employed in video cameras for general consumers, an image stabilizing optical apparatus is conventionally known. The image stabilizing optical apparatus controls a transmission light optical axis angle based on a magnitude of hand-shaking (angular displacement) of a video camera to suppress shaking of an imaged image caused by the hand-shaking. Here, the transmission light optical axis angle is an angle of an emergent side optical axis with respect to an incident side optical axis of an optical system.

In order to realize an image stabilizing optical apparatus of the type described above, an optical axis angle variation apparatus by which a transmission light optical axis angle can be corrected in accordance with a correction demand for a transmission light optical axis angle is required. Further, in order to realize the optical axis angle variation apparatus, an optical axis angle variation mechanism which can vary a transmission light optical axis angle is required.

As an optical axis angle variation mechanism of the type mentioned, a mechanism which employs a variable apex angle prism and another system which employs an optical system of the afocal type are conventionally known.

One of optical axis angle variation mechanisms of the type wherein a variable apex angle prism is employed is disclosed, for example, in Document 1 listed below. In the optical axis angle variation mechanism disclosed in Document 1, a variable apex angle prism is formed by encapsulating liquid between a pair of pivotally connected glass substrates and the angle between the glass substrates, that is, the apex angle of the variable apex angle prism, is varied to vary the transmission light optical axis angle.

Document 1: Japanese Patent Laid-Open
No. Showa 61-269572

Another optical axis angle variation mechanism of the type wherein a variable apex angle prism is employed is disclosed, for example, in Document 2 and Document 3 listed below. In the optical axis angle variation mechanism disclosed in Document 2 or 3, a plano-convex lens and a plano-concave lens having proximate spherical curvatures to each other are disposed such that spherical faces thereof are opposed to each other to form a variable apex angle prism and the two lenses are turned around the centers of the curvatures thereof to vary the angle defined by the flat surfaces of the lenses, that is, the angle of the variable apex angle prism, thereby to vary the transmission light optical axis angle.

Document 2: Japanese Patent Laid-Open
No. Heisei 06-070220
Document 3: Japanese Patent Laid-Open
No. Heisei 06-281889

As an optical axis angle variation mechanism which employs an optical system of the afocal type, an optical axis angle variation mechanism disclosed, for example, in Document 4 or Document 5 listed below is known. In the optical axis angle variation mechanism disclosed in Document 4 or 5, an optical system of the afocal type is formed from one concave lens and one convex lens, and the two lenses are moved perpendicularly to an optical axis and orthogonally to each other to vary the transmission light optical axis angle.

Document 4: Japanese Patent Laid-open
No. Heisei 06-118471
Document 5: Japanese Patent Laid-Open
No. Heisei 07-168235

However, a video camera for broadcasting business use has a large lens aperture, and a high speed responsibility is required for it. Where such an optical axis angle variation mechanism as disclosed in Document 1 is applied to a video camera for broadcasting business use, since the liquid has a considerably high viscosity, a high speed responsibility cannot be realized readily and high power dissipation is required. Further, since the video camera may possibly be used under severe conditions, there is the possibility that the liquid may leak or bubbles may be produced in the liquid by a drop of the air pressure, resulting in deterioration of the picture quality.

Meanwhile, in the optical axis angle variation mechanism disclosed in Document 2 or 3, the centers of turning movements of the two lenses are included in the optical path. While the optical axis angle variation mechanism requires a supporting mechanism for supporting the two lenses for turning motion, where it is applied to a video camera for broadcasting business use, since the video camera for broadcasting business use has a large lens aperture and has a high inertia, a large supporting mechanism and high power are required.

Further, in the optical axis angle variation mechanism disclosed in Document 4 or 5, as a supporting mechanism for supporting a lens for movement in a direction perpendicular to an optical axis, a suspension formed from a leaf spring or a like element disposed in the direction of the optical axis is employed. However, where the optical axis angle variation mechanism employs such a construction as just described, in order to support a large aperture lens, a long and large suspension is required. This gives rise to a problem that the supporting mechanism and an imaging optical system of the video camera may interfere with each other, another problem that it is difficult to assemble the support mechanism to the imaging optical system and a further problem that driving control of the suspension is difficult. Those problems arise also where a supporting mechanism which employs orthogonal slide guides are used as a supporting mechanism for a lens. Therefore, it is difficult to use the optical axis angle variation mechanism for a video camera for broadcasting business use.

SUMMARY OF THE INVENTION

It is an object of the present invention to provide an optical axis angle variation mechanism, an optical axis angle variation apparatus and an image stabilizer by which, even where an optical system of the afocal type is employed for an optical axis angle variation mechanism, the problem of interference with an imaging optical system, the problem of difficulty in assembly to the imaging optical system and the problem of difficulty in control of a driving system can be solved.

In order to attain the object described above, according to an aspect of the present invention, there is provided an optical axis angle variation mechanism, comprising an optical system including an optical axis angle variation lens movable in a direction perpendicular to an optical axis thereof to vary a transmission light optical axis angle, and turnably supporting means for supporting the optical axis angle variation lens for turning movement in a plane perpendicular to the optical axis.

According to another aspect of the present invention, there is provided an optical axis angle variation apparatus, comprising an optical system including an optical axis angle variation lens movable in a direction perpendicular to an optical axis thereof to vary a transmission light optical axis angle, turnably supporting means for supporting the optical axis angle variation lens for turning movement in a plane perpendicular to the optical axis, and turning driving means for driving the optical axis angle variation lens to turn to correct the transmission light optical axis angle.

According to a further aspect of the present invention, there is provided an image stabilizer for suppressing shaking of an image caused by shaking of an optical system, comprising an optical system including an optical axis angle variation lens movable in a direction perpendicular to an optical axis thereof to vary a transmission light optical axis angle, turnably supporting means for supporting the optical axis angle variation lens for turning movement in a plane perpendicular to the optical axis, shaking detection means for detecting shaking of the optical system, and turnably driving means for driving the optical axis angle variation lens to turn in response to a detection output of the shaking detection means to suppress shaking of an image caused by the shaking of the optical system.

According to a still further aspect of the present invention, there is provided an image stabilizer for suppressing shaking of an image caused by shaking of an optical system, comprising an optical system including first and second optical axis angle variation lenses movable in directions perpendicular to an optical axis thereof to vary a transmission light optical axis angle, first and second turnably supporting means for supporting the first and second optical axis angle variation lenses for turning movement in different directions from each other in a plane perpendicular to the optical axis, shaking detection means for detecting shaking of the optical system, and first and second turnably driving means for driving the first and second optical axis angle variation lenses to turn in response to a detection output of the shaking detection means to suppress shaking of an image caused by the shaking of the optical system.

With the optical axis angle variation mechanism, the optical axis angle variation apparatus and the image stabilizer of the present invention, as a supporting mechanism for supporting the optical axis angle variation lens for movement in an optical axis angle variation direction, the turnably supporting means for supporting the optical axis angle variation lens for turning movement in a plane perpendicular to the optical axis is employed. Consequently, the supporting mechanism can be formed in a comparatively small size.

Consequently, otherwise possible interference between the optical axis angle variation mechanism and the imaging optical system can be prevented, and assembly of the optical axis angle variation mechanism to the imaging optical system can be facilitated.

Further, where the optical axis angle variation mechanism having the construction described above is employed, the optical axis angle variation lens can be moved in an optical axis angle variation direction only by turning the optical axis angle variation lens. Consequently, driving control for the optical axis angle variation lens can be simplified.

Furthermore, where the optical axis angle variation mechanism having the construction described above is employed, since the load of the optical axis angle variation lens can be received by a turning shaft, smooth rocking motion of the lens can be realized. Consequently, a high speed responsibility and saving of power can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a schematic view illustrating a conventional movement of a lens for varying the optical axis angle;

FIG. 5 is a similar view but illustrating a movement of a lens of the optical axis angle variation mechanism of FIG. 2 for varying the optical axis angle;

DESCRIPTION OF THE PREFERRED EMBODIMENT

Figure 1:
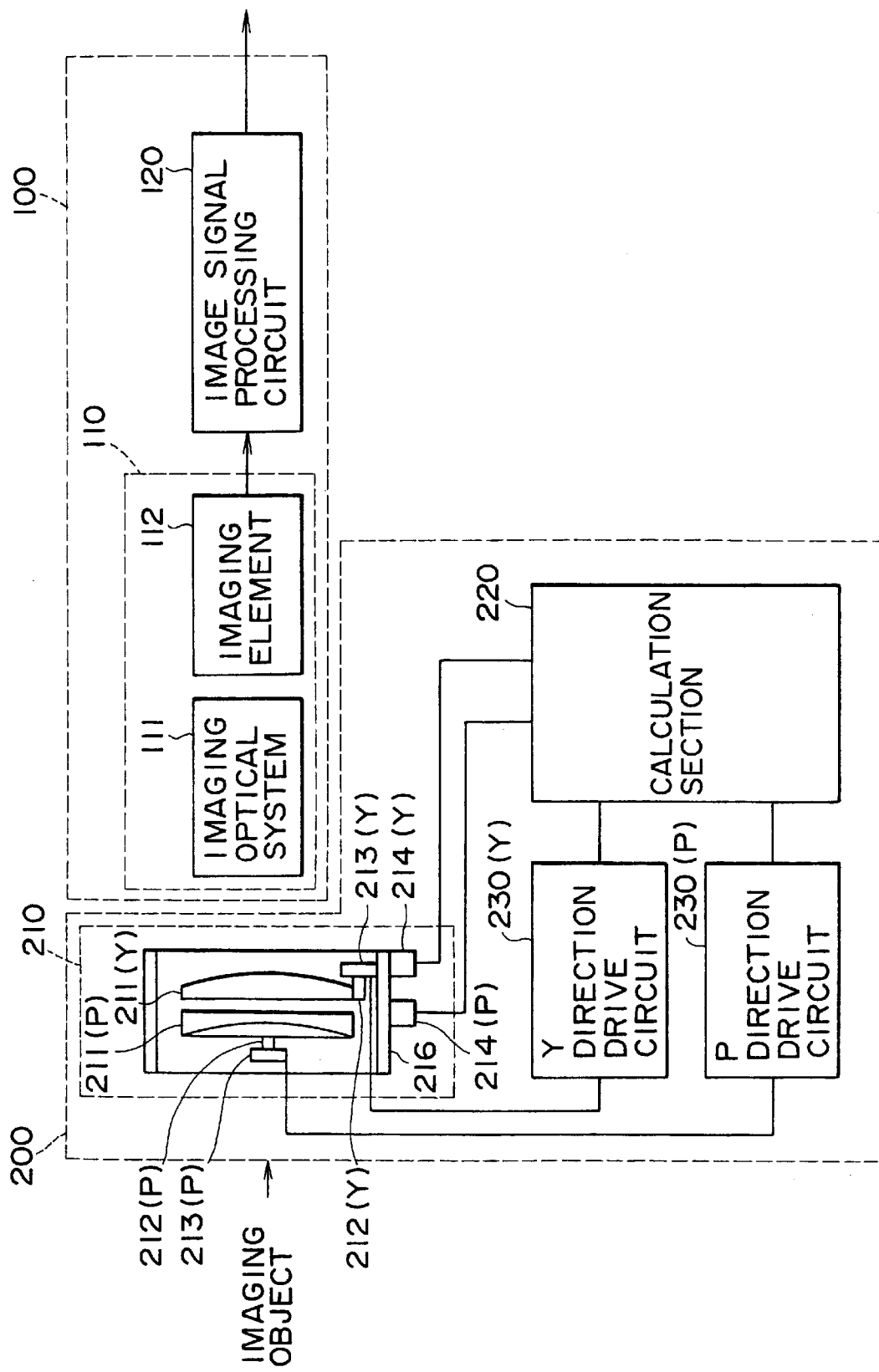
FIG. 1 is a block diagram of a video camera to which the present invention is applied.

Referring first to FIG. 1, there is shown an image stabilizer to which the present invention is applied. It is to be noted that the shaping correction apparatus of FIG. 1 to which the present invention is applied is shown applied to an image stabilizing optical apparatus for a video camera. Further, FIG. 1 shows an entire construction of the video camera which includes the image stabilizer to which the present invention is applied.

The video camera shown in FIG. 1 includes a camera body 100 for imaging an imaging object, and an image stabilizing optical apparatus 200 for suppressing shaking of an imaged image caused by hand-shaking of the video camera. The image stabilizing optical apparatus 200 is removably mounted on the camera body 100. In other words, the image stabilizing optical apparatus 200 is formed as an adaptable which can be used when necessary.

The camera body 100 includes an imaging or camera section 110 for converting an object of an imaging object into an electric imaging signal, and an image signal processing circuit 120 for converting the imaging signal outputted from the camera section 110 into an image signal. The camera section 110 includes an imaging optical system 111 for fetching an imaging object image, and an imaging element 112 for converting the object image fetched by the imaging optical system 111 into an electric imaging signal. Here, the imaging optical system 111 has an adjustable focal length. Meanwhile, the imaging element 112 is formed from, for example, charge coupled devices.

It is to be noted that the camera section 110 may have an imaging construction of the single plate type or otherwise of the two plate type, three plate type or four plate type in which a dichroic prism or a dichroic mirror is employed.

The image stabilizing optical apparatus 200 detects a magnitude of hand-shaking (variation in orientation) of the video camera, that is, a relative angular displacement of the imaging optical axis, and corrects the transmission light optical axis angle based on the detection output to control shaking of an imaged image by hand-shaking of the video camera. In this instance, the angular displacement of hand-shaking is detected, for example, using two axes perpendicular to the optical axis and orthogonal to each other. For those axes, for example, an axis of a pitching P direction (tilting direction) and another axis of a yawing Y direction (panning direction) are used.

In the following, a construction of the image stabilizing optical apparatus 200 is described in detail. It is to be noted that, in the following description, the character P is added to the reference numeral of any component which relates to the pitching P direction, and Y is added to the reference numeral of any component which relates to the yawing Y direction.

The image stabilizing optical apparatus 200 shown in FIG. 1 includes an image stabilizing optical mechanism 210 including an optical axis angle variation mechanism and so forth, a calculation section 220 for calculating aimed values for turning movements of a pair of lenses 211(P) and 211(Y), which will be hereinafter described, a P direction drive circuit 230(P) for driving a drive motor 213(P) for the pitching P direction, which will be hereinafter described, to rotate, and a Y direction drive circuit 230(Y) for driving a drive motor 213(Y) for the yawing Y direction, which will be hereinafter described, to rotate. The calculation section 220 is formed from, for example, a CPU.

The image stabilizing optical mechanism 210 includes a plano-concave lens 211(P) and a plano-convex lens 211(Y) which form an optical system of the afocal type, a turning shaft 212(P) for supporting the plano-concave lens 211(P) for turning movement in a plane perpendicular to an optical axis of the plano-concave lens 211(P), and a turning shaft 212(Y) for supporting the plano-convex lens 211(Y) for turning movement in a plane perpendicular an optical axis of the plano-convex lens 211(Y). Those elements form an optical axis angle variation mechanism. The construction of the optical angle axis variation mechanism is hereinafter described in detail.

Further, the image stabilizing optical mechanism 210 includes a drive motor 213(P) for driving the plano-concave lens 211(P) to turn, another drive motor 213(Y) for driving the plano-convex lens 211(Y) to turn, a shaking detector 214(P) for detecting an angular displacement (angular velocity) of hand-shaking of the video camera per unit time in the pitching P direction, and another shaking detector 214(Y) for detecting an angular displacement (angular velocity) of the hand-shaking of the video camera per unit time in the yawing Y direction. Each of the shaking detectors 214(P) and 214(Y) is formed from an angular velocity sensor such as, for example, an oscillation gyro.

The image stabilizing optical mechanism 210 further includes a barrel housing 216 for accommodating the lenses 211(P) and 211(Y) and so forth therein. The barrel housing 216 is disposed such that the center axis thereof is registered with the optical axis of the imaging optical system 111. The lenses 211(P) and 211(Y), turning shafts 212(P) and 212(Y), and drive motors 213(P) and 213(Y) are accommodated in the inside of the barrel housing 216, and the shaking detectors 214(P) and 214(Y) are mounted on the outer side of the barrel housing 216. The video camera has such an overall construction as described above.

Figure 2:
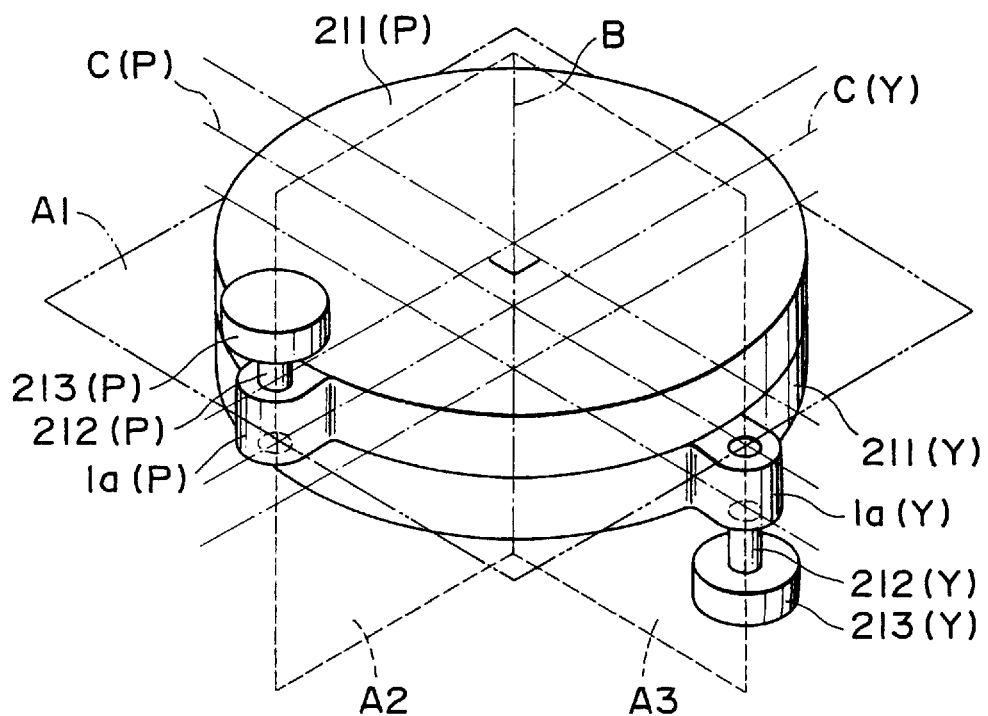
FIG. 2 is a perspective view of an optical axis angle variation mechanism according to the present invention which is employed in the video camera shown in FIG. 1.

Referring now to FIG. 2, there is shown in perspective view a construction of the optical axis angle variation mechanism. The plano-concave lens 211(P) and the plano-convex lens 211(Y) are constructed such that they have a substantially equal aperture and a substantially equal focal length. The lenses 211(P) and 211(Y) are disposed in an opposing relationship to each other with a very small gap left therebetween along an imaginary plane A1. Consequently, the lenses 211(P) and 211(Y) generally form an optical system of the afocal type.

More particularly, the lenses 211(P) and 211(Y) are disposed in an opposing relationship to each other such that the plain surfaces thereof are opposed to each other as seen in FIG. 1. Further, the lenses 211(P) and 211(Y) are disposed such that a coaxial optical axis B (refer to FIG. 2) is registered with the optical axis of the imaging optical system 111. Consequently, the lenses 211(P) and 211(Y) are disposed such that the coaxial optical axis B is registered with the center of an image area. Here, the coaxial optical axis B is an optical axis when the optical axes of the lenses 211(P) and 211(Y) are registered with each other.

The plano-concave lens 211(P) is supported for turning motion on the turning shaft 212(P) by a bearing 1a(P) provided on an outer periphery thereof. The turning shaft 212(P) extends in parallel to the optical axis of the plano-concave lens 211(P). Consequently, the plano-concave lens 211(P) is supported for turning movement in a plane perpendicular to the optical axis.

The plano-convex lens 211(Y) is supported for turning motion on the turning shaft 212(Y) by another bearing 1a(Y) provided on an outer periphery thereof. The turning shaft 212(Y) extends in parallel to the optical axis of the plano-convex lens 211(Y). Consequently, the plano-convex lens 211(Y) is supported for turning movement in another plane perpendicular to the optical axis.

In this instance, the turning shafts 212(P) and 212(Y) are positioned such that a plane A2 which includes the turning shaft 212(P) and the coaxial optical axis B and another plane A3 which includes the turning axis 212(Y) and the coaxial optical axis B extend substantially orthogonally to each other. Consequently, the lenses 211(P) and 211(Y) are turned in directions substantially orthogonal to each other.

The turning shaft 212(P) is positioned on a horizontal line C(Y) (straight line extending in the yawing Y direction) which passes the coaxial optical axis B. Consequently, the plano-convex lens 211(Y) is turned along the pitching P direction. Similarly, the turning shaft 212(Y) is positioned on a vertical line C(P) (straight line extending in the pitching P direction) which passes the coaxial optical axis B. Consequently, the plano-convex lens 211(Y) is turned along the yawing Y direction.

The optical axis angle variation mechanism has such a construction as described above. It is to be noted that the drive motor 213(P) described above is directly coupled to the turning shaft 212(P) of the plano-concave lens 211(P) on the side remote from the imaginary plane A1. Similarly, the drive motor 213(Y) described above is directly coupled to the turning shaft 212(Y) of the plano-convex lens 211(Y) on the side remote from the imaginary plane A1.

Operation of the video camera having such a construction as described above is described below.

First, an imaging operation of the video camera is described. Referring to FIG. 1, an image of an imaging object is formed on the imaging element 112 by the lenses 211(P) and 211(Y) and the imaging optical system 111. The imaging object image formed on the imaging element 112 is converted into an electric imaging signal by the imaging element 112. The imaging signal is supplied to the image signal processing circuit 120, by which it is converted into an image signal. The image signal is supplied, for example, to a recording and reproduction section not shown so that it is recorded onto a magnetic tape.

Subsequently, a hand-shaking correction operation of the image stabilizing optical apparatus 200 is described. Here, before a general operation of the image stabilizing optical apparatus 200 is described, operation of the optical axis angle variation mechanism is described in order to facilitate understanding of the general operation.

Figure 3:
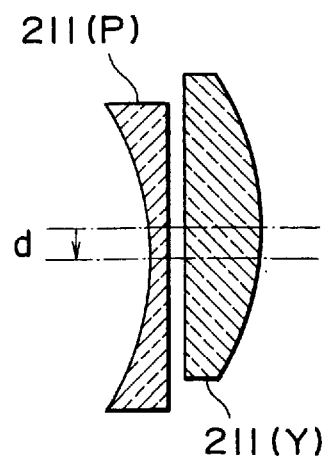
FIG. 3 is a view illustrating an optical axis angle variation method which is applied to an optical system of the afocal type.

The optical axis angle variation mechanism which employs an optical system of the afocal type as an optical system thereof varies the transmission light optical axis angle by moving a lens, which forms the optical system, in a direction perpendicular to the optical axis of the optical system. An example of such movement is illustrated in FIG. 3. It is to be noted that FIG. 3 is a sectional view of the optical system of the afocal type as viewed from one side. Further, FIG. 3 shows, as the optical system of the afocal type, the optical system in the present embodiment.

FIG. 3 illustrates a movement when the plano-concave lens 211(P) is moved downwardly by a distance d. In the prior art apparatus described hereinabove, the plano-concave lens 211(P) is supported by means of a suspension so as to allow the plano-concave lens 211(P) to be moved down by the distance d by a linear movement. This manner of movement is illustrated in FIG. 4. It is to be noted that FIG. 4 is a front elevational view of the optical system as viewed, for example, from the front of the video camera.

In contrast, with the video camera in the present embodiment, since the plano-concave lens 211(P) is supported for turning motion by the turning shaft 212(P), the plano-concave lens 211(P) is moved down by the distance d by turning or circular movement. This manner of movement is illustrated in FIG. 5. Also FIG. 5 is a front elevational view of the optical system as viewed, for example, from the front of the video camera.

Figure 6:
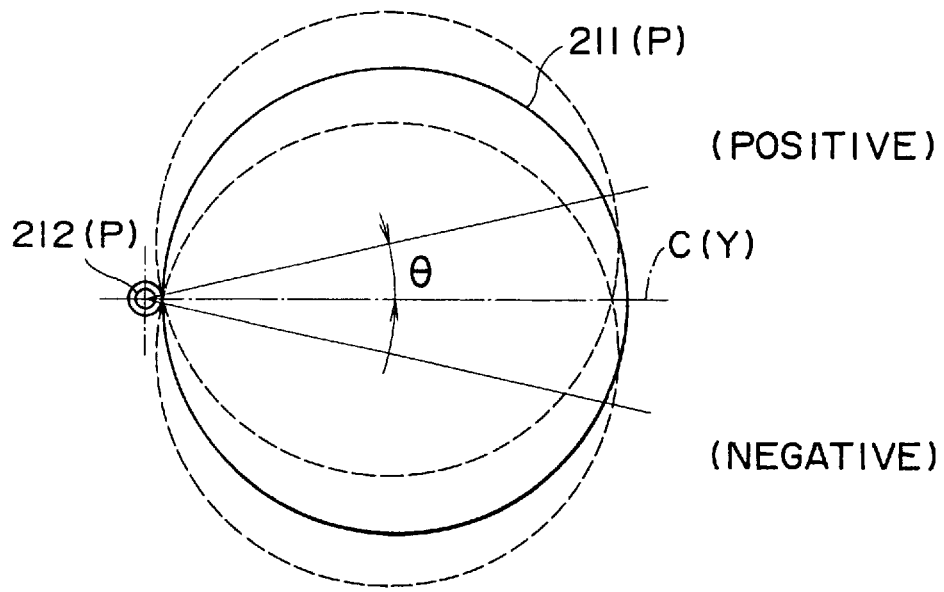
FIG. 6 is a diagrammatic view showing a locus of turning movement of a plano-concave lens of the optical axis angle variation mechanism of FIG. 2.
Figure 7:
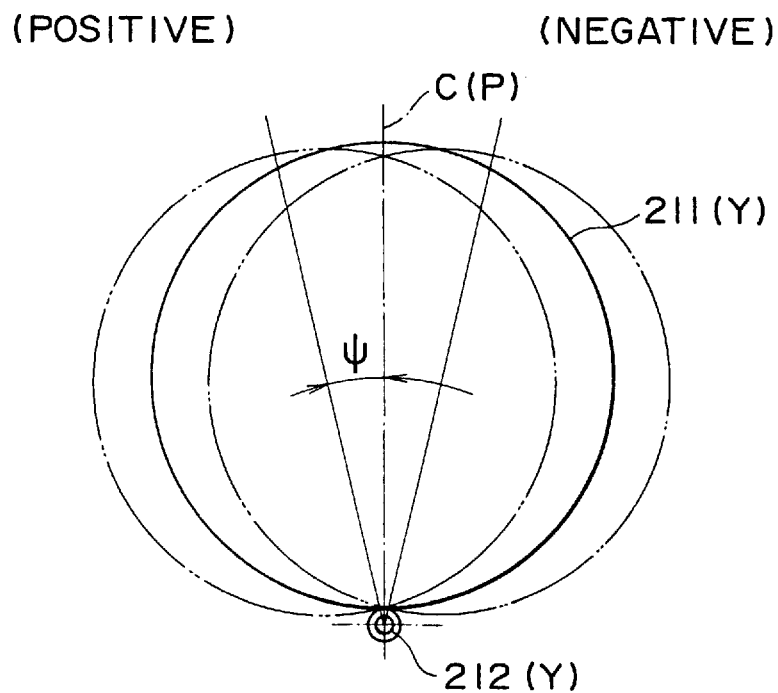
FIG. 7 is a diagrammatic view showing a locus of turning movement of a plano-convex lens of the optical axis angle variation mechanism of FIG. 2.
Figure 8:
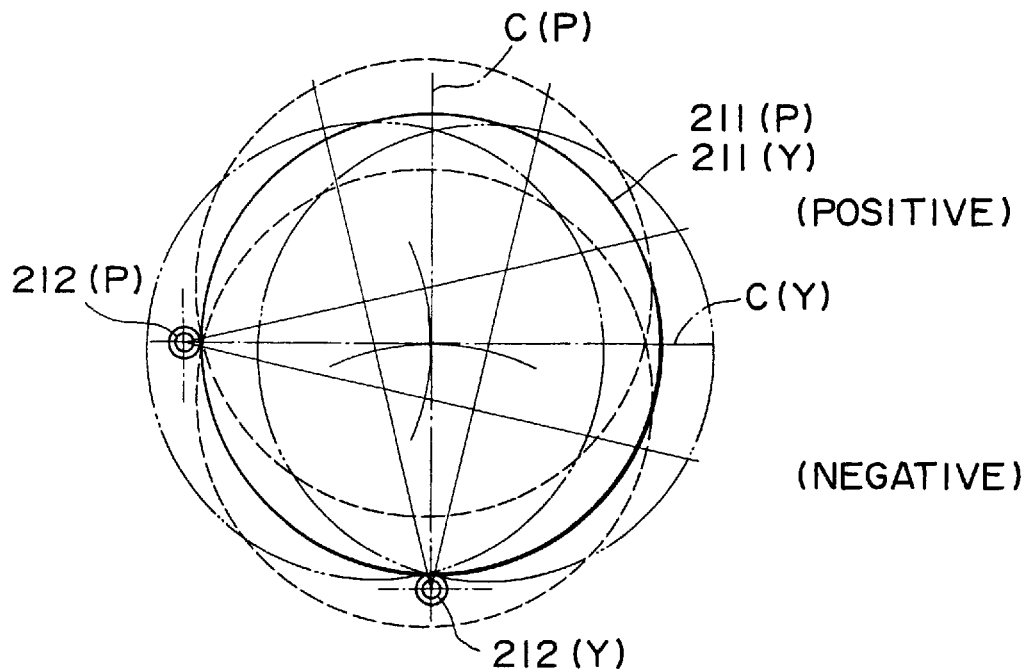
FIG. 8 is a diagrammatic view illustrating composition of the loci of turning movement of the plano-concave lens and plano-convex lens shown in FIGS. 6 and 7.

FIGS. 6 to 8 illustrate turning movements of the lenses 211(P) and 211(Y). FIGS. 6 to 8 are front elevational views of the lenses 211(P) and 211(Y) as viewed, for example, from the front of the video camera. More particularly, FIG. 6 illustrates a locus of a turning movement of the plano-concave lens 211(P) while FIG. 7 illustrates a locus of a turning movement of the plano-convex lens 211(Y), and FIG. 8 illustrates the loci of turning movements of the lenses 211(P) and 211(Y) in an overlapping relationship.

As seen from FIG. 6, the plano-concave lens 211(P) is turned with respect to the horizontal line C(Y) which passes the turning shaft 212(P). In FIG. 6, the plano-concave lens 211(P) is shown turned by an angle θ toward the positive side (for example, in the upward direction in FIG. 6) or the negative side (for example, in the downward direction in FIG. 6) with respect to the horizontal line C(Y).

Here, the angular displacement of the video camera in the pitching P direction by hand-shaking is usually approximately ±0.3 degrees. Accordingly, the turning angle of the plano-concave lens 211(P) necessary to compensate for or cancel the hand-shaking may be small. Consequently, the locus of turning movement of the plano-concave lens 211(P) substantially extends along the pitching P direction. As a result, the transmission light optical axis angle is displaced substantially along the pitching P direction.

Meanwhile, as seen from FIG. 7, the plano-convex lens 211(Y) is turned with respect to the vertical line C(P) which passes the turning shaft 212(Y). In FIG. 7, the the plano-convex lens 211(Y) is shown turned by an angle θ toward the positive side (for example, in the rightward direction in FIG. 7) or the negative side (for example, in the leftward direction in FIG. 7) with respect to the vertical line C(P).

Here, the angular displacement of the video camera in the yawing Y direction by hand-shaking is usually approximately ±0.3 degrees. Accordingly, the turning angle of the plano-convex lens 211(Y) necessary to compensate for the hand-shaking may be small. Consequently, the locus of turning movement of the plano-convex lens 211(Y) substantially extends along the yawing Y direction. As a result, the transmission light optical axis angle is displaced substantially along the yawing Y direction.

Therefore, if the locus of turning movement of the plano-concave lens 211(P) and the locus of turning movement of the plano-convex lens 211(Y) are drawn in an overlapping relationship with each other as shown in FIG. 8, then it can be seen that the transmission light optical axis angle can be displaced in all directions defined by two orthogonal axes similarly as with a variable apex angle prism which allows two-dimensional angular displacement.

Figure 9:
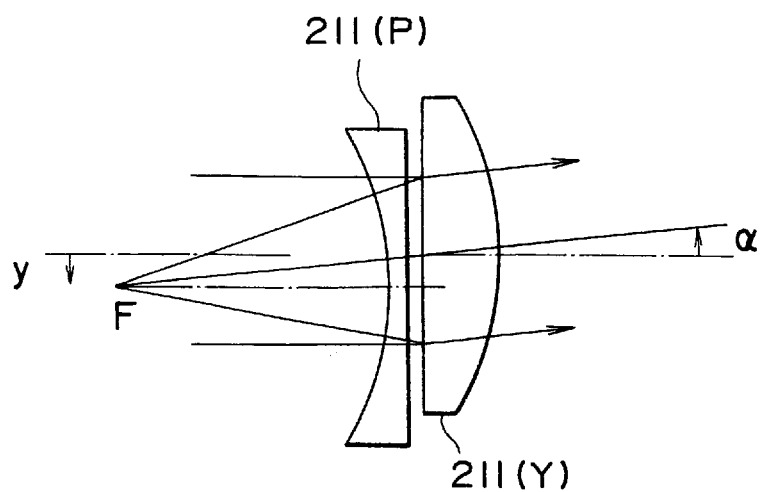
FIG. 9 is a diagrammatic view illustrating operation of the optical axis angle variation mechanism shown in FIG. 2.

FIG. 9 is a diagrammatic view illustrating an example of a state wherein the transmission light optical axis angle is displaced toward the positive side in the pitching P direction.

It is assumed now that the lenses 211(P) and 211(Y) are positioned with the optical axes thereof registered with each other. In this state, if rays of light of an imaging object parallel to the optical axis of the plano-concave lens 211(P) is introduced into the plano-concave lens 211(P), then a virtual image is formed at a focus F of the plano-concave lens 211(P). Consequently, from the plano-concave lens 211(P), divergent light diverging from a virtual light source provided by the focus F is emitted. The divergent light is introduced into the plano-convex lens 211(Y) which has an equal focal length to that of the plano-concave lens 211(P). Consequently, from the plano-convex lens 211(Y), parallel light is emitted while the virtual light source serves as a light source at the focus F.

If, in this state, the plano-concave lens 211(P) is displaced by a distance y toward the negative side in the pitching P direction as seen in FIG. 9, then the transmission light optical axis angle is displaced by α to the positive side in the pitching P direction. Consequently, parallel light displaced by the angle α from the optical axis of the incident light is emitted from the plano-concave lens 211(Y) as seen in FIG. 9.

In this instance, the angle α is given by the following expression:

$$\alpha = \tan^{-1}(y/f)$$

where f is the focal length of the plano-concave lens 211(P) and plano-convex lens 211(Y).

It is to be noted that, while detailed description is omitted herein, if the plano-concave lens 211(P) is displaced toward the positive side in the pitching P direction, then the transmission light optical axis angle can be displaced to the negative side in the pitching P direction. Meanwhile, if the plano-convex lens 211(Y) is displaced toward the positive side or the negative side in the yawing Y direction, then the transmission light optical axis angle can be displaced to the negative side or the positive side in the yawing Y direction.

In this manner, the transmission light optical axis angle can be corrected in any direction defined by two orthogonal axes by turning the lenses 211(P) and 211(Y). Consequently, shaking of an imaged image caused by the hand-shaking can be suppressed.

Now, a general operation of the image stabilizing optical apparatus 200 is described. When the video camera is free from hand-shaking, the lenses 211(P) and 211(Y) are positioned such that the optical axes thereof are registered with the center of the image area. If hand-shaking occurs in this state, then the angular displacement of the shaking is detected by the shaking detectors 214(P) and 214(Y). In this instance, the angular displacement of the shaking in the pitching P direction is detected by the shaking detector 214(P) while the angular displacement in the yawing Y direction is detected by the shaking detector 214(Y). Consequently, the angular displacement of the shaking of the video cameral in any direction is detected as components in the directions of the two orthogonal axes.

The detection outputs are supplied to the calculation section 220. The calculation section 220 calculates turning angles (hereinafter referred to "hand-shaking compensation turning angles" of the lenses 211(P) and 211(Y) necessary to compensate for the hand-shaking. Data representative of the hand-shaking compensation turning angles are supplied as data indicating aimed values of turning angles of the lenses 211(P) and 211(Y) to the drive circuits 230(P) and 230(Y), respectively.

Upon reception of the data, the drive circuits 230(P) and 230(Y) drive the drive motors 213(P) and 213(Y) to rotate by amounts corresponding to differences between the hand-shaking compensation turning angles indicated by the data and current turning angles of the lenses 211(P) and 211(Y), respectively. Consequently, the lenses 211(P) and 211(Y) are driven to rotate until the respective hand-shaking compensation correction angles are reached. Consequently, the transmission light optical axis angle is corrected to the aimed value therefor. As a result, shaking of an imaged image caused by hand-shaking is suppressed.

Now, operation of the calculation section 220 is described in more detail with reference to FIG. 10 which is a flow chart illustrating processing of the calculation section 220. The driving control system of the image stabilizing optical apparatus 200 including the calculation section 220, drive circuits 230(P) and 230(Y), and drive motors 213(P) and 213(Y) is activated when a main switch not shown is connected, but is deactivated when the main switch is disconnected. Then, the processing illustrated in FIG. 10 is started when a power supply switch not shown of the image stabilizing optical apparatus 200 is connected, but is ended when the power supply switch is disconnected.

Figure 10:
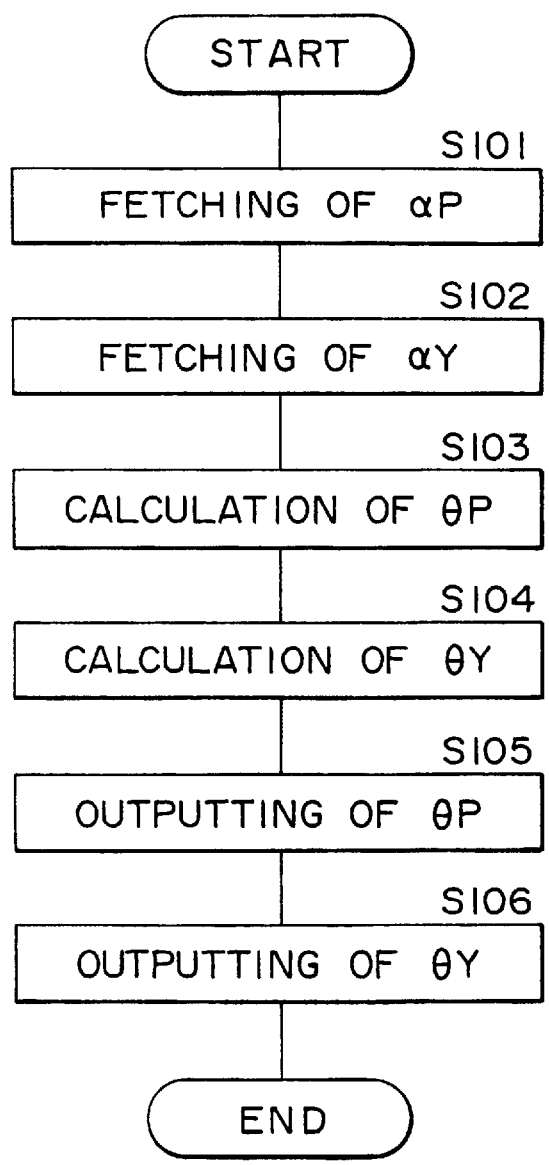
FIG. 10 is a flow chart illustrating operation of a calculation section of the video camera of FIG. 1.

In the processing illustrated in FIG. 10, the calculation section 220 first fetches a detection output of the shaking detector 214(P) for the pitching P direction (step S101). Consequently, an angular displacement $\alpha P$ of shaking of the video camera in the pitching P direction is fetched. After this processing is completed, the calculation section 220 fetches a detection output of the shaking detector 214(Y) (step S102). Consequently, an angular displacement $\alpha Y$ of shaking of of the video camera in the yawing Y direction is fetched.

Then, the calculation section 220 calculates a hand-shaking compensation turning angle $\theta P$ of the plano-concave length 211(P) based on the angular displacement $\alpha p$ of the shaking in the pitching P direction (step S103). After this processing is completed, the calculation section 220 calculates a hand-shaking compensation turning angle $\theta Y$ of the plano-convex lens 211(Y) based on the angular displacement $\alpha y$ of the shaking in the yawing Y direction (step S104).

Thereafter, the calculation section 220 supplies the hand-shaking compensation turning angle $\theta p$ calculated in step S103 as an aimed value for the turning angle of the plano-concave lens 211(P) to the drive circuit 230(P) for the pitching P direction (step S105). Consequently, the plano-concave lens 211(P) is driven to be turned until the turning angle thereof becomes equal to the aimed value. After this processing is completed, the calculation section 220 supplies the hand-shaking compensation turning angle $\theta Y$ calculated in step S104 as an aimed value for the turning angle of the plano-convex lens 211(Y) to the drive circuit 230(Y) for the yawing Y direction (step S106). Consequently, the plano-convex lens 211(Y) is driven to be turned until the turning angle thereof becomes equal to the aimed value.

By the processing described above, the transmission light optical axis angle is adjusted to the aimed value. As a result, shaking of an imaged image by the hand-shaking is suppressed.

As the processing in step S106 is completed, one cycle of correction operation is completed. Thereafter, the calculation section 220 executes the processing beginning with step S101 again. Then, every time one cycle of compensation operation is completed, the operation described above is repeated in a similar manner. The operation described above is ended at a point of time when the power supply switch is switched to a disconnected state as described hereinabove.

With the video camera described in detail above, since, as a supporting mechanism for supporting the lenses 211(P) and 211(Y) for movement in optical axis angle variation directions, a turning supporting mechanism for supporting the lenses 211(P) and 211(Y) for turning movement in planes perpendicular to the optical axes of them, the supporting mechanism can be formed in a comparatively small size. Consequently, otherwise possible interference between the optical axis angle variation mechanism and the imaging optical system 111 can be prevented and assembly of the optical axis angle variation mechanism to the imaging optical system 111 can be facilitated.

Further, where such construction as described above is employed, since the lenses 211(P) and 211(Y) can be moved in the optical axis angle variation directions only by turning the lenses 211(P) and 211(Y), the driving control for moving the lenses 211(P) and 211(Y) in the optical axis angle variation directions can be simplified.

Furthermore, where such construction as described above is employed, since the loads of the lenses 211(P) and 211(Y) can be received by the turning shafts 212(P) and 212(Y), respectively, smooth rocking movements of the lenses 211 (P) and lens 211(Y) can be realized. Consequently, a high speed responsibility and power saving can be achieved.

While the specific embodiment of the present invention is described above, the present invention is not limited to the specific embodiment.

For example, in the embodiment described above, the entire image stabilizing optical apparatus 200 is formed as an adapter. However, according to the present invention, part of the image stabilizing optical apparatus 200 may be formed as an adapter. For example, the calculation section 220 and the drive circuits 230(Y) and 230(P) may be incorporated in the camera body 100 while only the image stabilizing optical mechanism 210 is formed as an adapter.

Further, in the embodiment described above, the image stabilizing optical apparatus 200 is formed as an adapter. However, according to the present invention, the image stabilizing optical apparatus 200 may be built in a video camera. In this instance, according to the present invention, since the support mechanism for the lenses 211(P) and 211(Y) is small in size, the image stabilizing optical apparatus 200 can be built in a video camera readily.

Further, in the embodiment described above, the present invention is applied to an image stabilizing optical apparatus which includes, as an optical system, an optical system of the afocal type which includes one concave lens and one convex lens. However, the present invention can be applied to an image stabilizing optical apparatus which includes an optical system of the afocal system which includes a plurality of concave lenses and a plurality of convex lenses.

Further, in the embodiment described above, the present invention is applied to an image stabilizing optical apparatus wherein a concave lens and a convex lens are moved in perpendicular directions. However, the preset invention can be applied to any image stabilizing optical apparatus wherein a concave lens and a convex lens are moved in different directions from each other.

Further, in the embodiment described above, the present invention is applied to an image stabilizing optical apparatus which includes two lenses as optical axis angle variation lenses. However, the present invention can be applied to any image stabilizing optical apparatus which includes a single lens as an optical axis angle variation lens. In other words, the present invention can be applied to an image stabilizing optical apparatus which compensates for shaking only in one direction.

Further, in the embodiment described above, the present invention is applied to an image stabilizing optical apparatus which has an optical system of the afocal type as an optical system. However, the present invention can be applied to any image stabilizing optical apparatus which includes an optical system by which the transmission light optical axis angle can be varied by moving a lens in a direction perpendicular to the optical axis of the optical system.

Further, in the embodiment described above, the present invention is applied to an image stabilizing optical apparatus of a video camera. However, the present invention can be applied also to an image stabilizing optical apparatus for an optical system of an apparatus other than a video camera. For example, the present invention can be applied to an image stabilizing optical apparatus of an electronic still camera.

Further, in the embodiment described above, the present invention is applied to an image stabilizing optical apparatus. However, the present invention can be applied to an image stabilizer which suppresses shaking of an image by shaking other than hand-shaking. Accordingly, the present invention can be applied also to an image stabilizer for an optical system which is secured to a tripod when to be used such as a motion picture camera or a moving picture projector. This is because, also with an optical system of the type mentioned, there is the possibility that shaking of an image may be caused by vibrations applied to the apparatus from the outside.

Further, in the foregoing description, the present invention is applied to an image stabilizer wherein the transmission light optical axis angle is corrected in order to compensate for shaking. However, the present invention can be applied also to an apparatus wherein the transmission light optical axis angle is varied positively.

Thus, it will be apparent to one of ordinary skill in the art that many changes and modifications can be made to the embodiment described hereinabove without departing from the spirit and scope of the invention as set forth herein.

What is claimed is:

1. An optical axis angle variation mechanism, comprising:
   an optical system including an optical axis angle variation lens comprising first and second lenses movable in a direction perpendicular to an optical axis of said optical axis angle variation lens to vary a transmission light optical axis angle; and
   turnably supporting means for supporting said optical axis angle variation lens, said turnably supporting means comprising a first turnably supporting member for turning said first lens in a first direction in a plane perpendicular to said optical axis and comprising a second turnably supporting member for turning said second lens in a second direction, independent of said first direction, in another plane perpendicular to said optical axis.

2. The optical axis angle variation apparatus according to claim 1, further comprising
   turning driving means for driving said optical axis angle variation lens to turn to correct the transmission light optical axis angle.

3. The optical axis angle variation apparatus according to claim 2, wherein
   said driving means includes a first turning driving member for driving said first lens to turn to correct the transmission light optical axis angle and a second turning driving member for driving said second lens to turn to correct the transmission light optical axis angle.

4. The optical axis angle variation apparatus according to claim 2, wherein said turnably supporting means supports said optical axis angle variation lens for turning movement at a portion in the proximity of an outer periphery of said optical axis angle variation lens.

5. The optical axis angle variation apparatus according to claim 3, wherein said first lens is a concave lens and said second lens is a convex lens combined with said concave lens to form an optical system of the afocal type, said first and second lenses being disposed such that a flat surface of said first lens faces a respective flat surface of said second lens.

6. The optical axis angle variation apparatus according to claim 1, wherein said first and second turnably supporting members turn said first lens and said second lens, respectively, in said first and second directions orthogonal to each other.

7. The optical axis angle variation apparatus according to claim 3, wherein said optical system is constructed such that a coaxial optical axis when the optical axis of said first lens and the optical axis of said second lens are registered with each other is positioned at the center of an image area.

8. An image stabilizer for suppressing shaking of an image caused by shaking of an optical system, comprising:
   an optical system including an optical axis angle variation lens comprising first and second lenses movable in a direction perpendicular to an optical axis of said optical axis angle variation lens to vary a transmission light optical axis angle;

turnably supporting means for supporting said optical axis angle variation lens, said turnably supporting means comprising a first turnably supporting member for turning said first lens in a first direction in a plane perpendicular to said optical axis and comprising a second turnably supporting member for turning said second lens in a second direction, independent of said first direction, in another plane perpendicular to said optical axis;

shaking detection means for detecting shaking of said optical system; and turnably driving means for driving said optical axis angle variation lens to turn in response to a detection output of said shaking detection means to suppress shaking of an image caused by the shaking of said optical system.

9. The image stabilizer according to claim 8, wherein said turnably driving means comprises first and second turnably driving members for driving said first and second lenses, respectively.

10. The image stabilizer according to claim 8, wherein at least part of said image stabilizer is formed as an adapter which can be removably assembled to a body of said optical system.

11. The image stabilizer according to claim 8, wherein said first lens is plano-concave and said second lens is plano-convex, said first and second lenses being disposed such that a flat surface of said first lens faces a respective flat surface of said second lens.

* * * * *